UNITED STATES PATENT OFFICE.

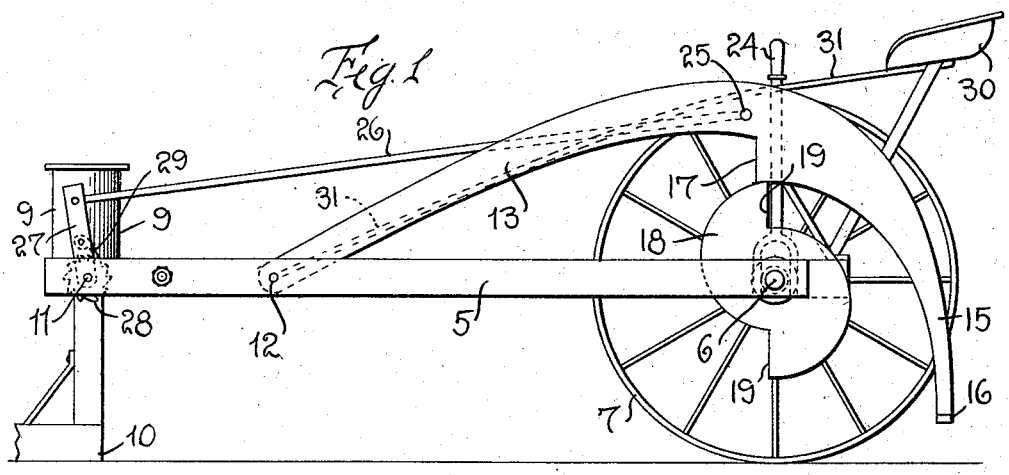
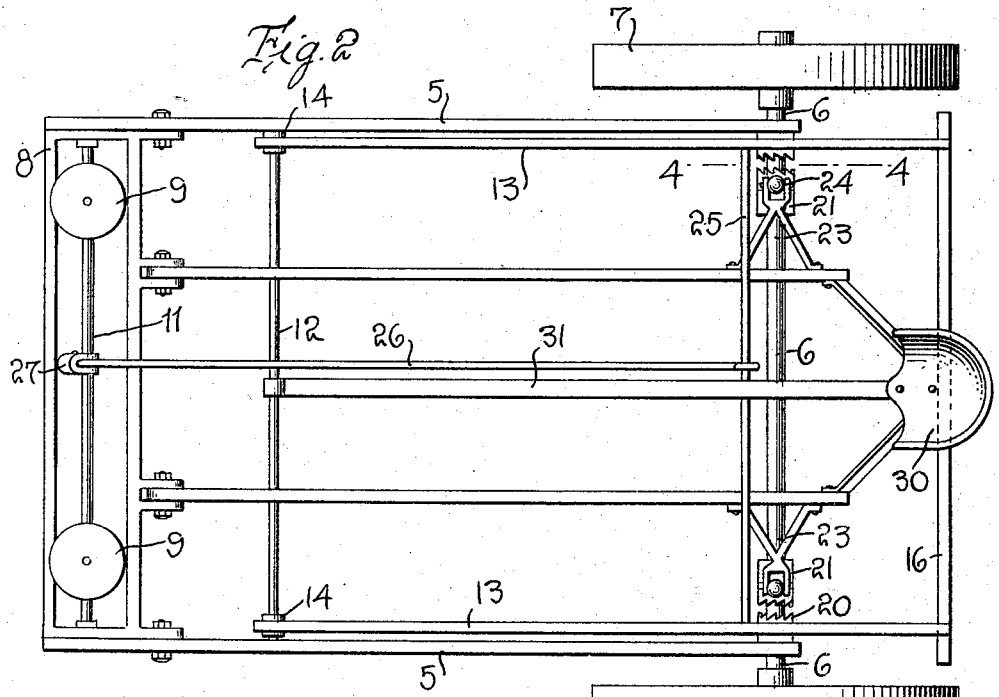

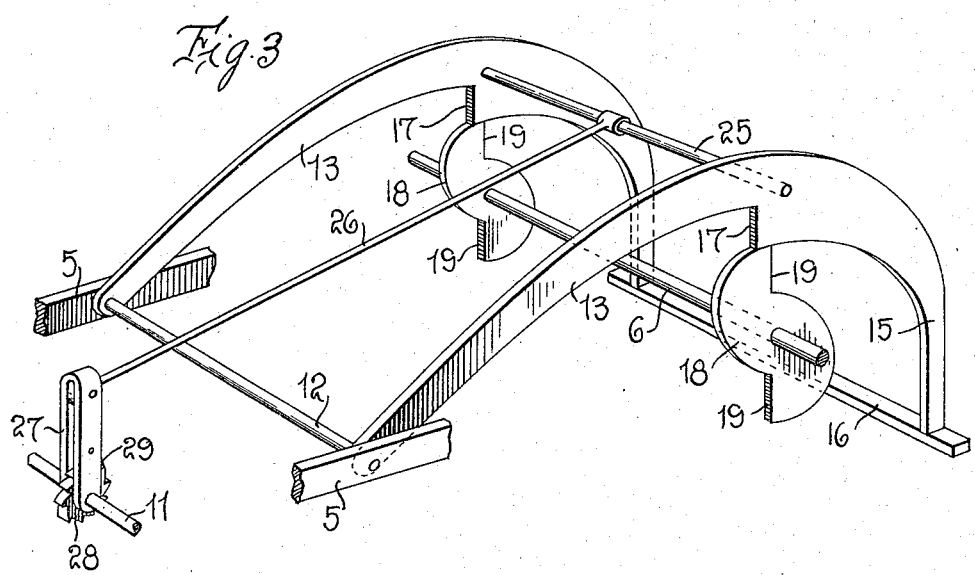
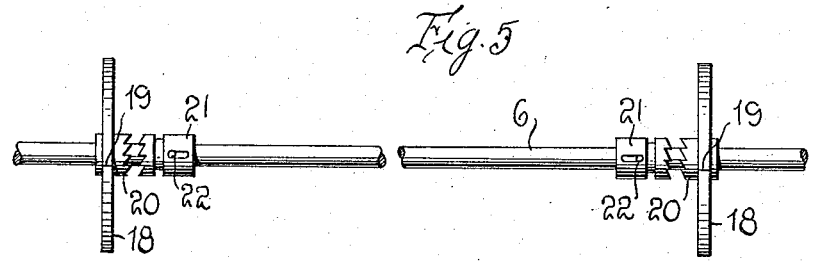
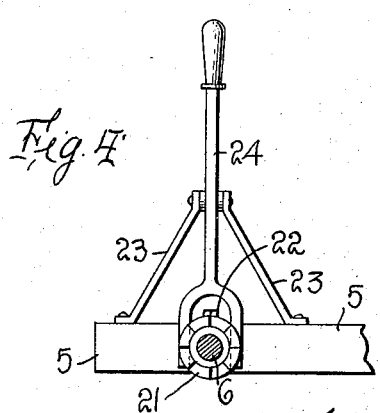

GRANVIL F. DALLAS, OF CORRYTON, TENNESSEE.

CAM MECHANISM.

1,216,956.   Specification of Letters Patent.   Patented Feb. 20, 1917.

Application filed May 27, 1916. Serial No. 100,308.

*To all whom it may concern:*

Be it known that I, GRANVIL F. DALLAS, a citizen of the United States, residing at Corryton, in the county of Knox and State of Tennessee, have invented certain new and useful Improvements in Cam Mechanisms, of which the following is a specification, reference being had to the accompanying drawings.

This invention relates to an improved corn planter and has for its primary object to provide improved means for insuring the dropping of the seed corn in properly spaced hills as the machine traverses the field.

It is another and more particular object of the invention to provide in combination with the ordinary type of corn planter having seed hoppers from which the seed is deposited at intervals in spaced rows, an improved automatically actuated marking device, and means operatively connecting the marking device with the shaft of the planter mechanism whereby the mechanisms are actuated to deposit the seed in properly spaced hills.

It is an additional object of the invention to provide an exceedingly simple mechanism for the above purpose whereby the distance between the spaced hills may be varied at the option of the operator.

With the above and other objects in view, my invention consists in the novel features of construction, combination and arrangement of parts to be hereinafter more fully described, claimed and illustrated in the accompanying drawing, in which, Figure 1 is a side elevation of a corn planter constructed in accordance with the preferred embodiment of the invention;

Fig. 2 is a top plan view thereof;

Fig. 3 is a perspective view of the marker and the operating connection with the planter shaft;

Fig. 4 is a vertical section taken on the line 4—4 of Fig. 2; and

Fig. 5 is a detail elevation of the wheel shaft and cam clutches.

Referring in detail to the drawings, 5 designates a suitable frame which is mounted at its rear end upon the axle 6 on the opposite ends of which the ground wheels 7 are securely fixed. A transverse frame 8 connects the side and intermediate longitudinal bars of the frame 5 at their forward ends, and upon this transverse frame the seed hoppers 9 are mounted. These hoppers are equipped with seed depositing mechanisms of any preferred construction to deposit the seed at intervals in the boots 10 which are suspended from the frame 8 beneath each hopper and are provided with runners on their lower ends in the usual manner. 11 designates the planter shaft mounted in the frame 8 to simultaneously actuate the plunger mechanisms.

A transverse rod 12 connects the longitudinal bars of the frame 5 at a point intermediate of their ends, and upon this rod the spaced upwardly and rearwardly extending arms 13 are loosely mounted. Collars 14 are fixed to the rod on the opposite sides of the arms 13 to prevent longitudinal shifting movement of the arms on said rod. The rear portion of each arm 13 is downwardly curved, as at 15, and the lower ends of said arms are connected by a transverse marker bar 16. The arms 13 are also relatively wide at their curved portions and each arm is formed with a square shoulder 17. Upon the wheel axle 6 and in vertical alinement with each of the arms 13, a double cam 18 is loosely mounted, said cams being formed at diametrically opposite points with the radially disposed shoulders 19. Each of the cams 18 is also provided with an inwardly extending clutch sleeve 20 for engagement by a complementary clutch member 21 which is longitudinally slidable upon the axle 6. Each of these latter clutch members is provided with a longitudinal slot to receive a set screw 22 threaded in the wheel axle. Upon brackets or supports 23 mounted upon the intermediate bars of the frames 5, the clutch shifting levers 24 are fulcrumed, said levers having yokes on their lower ends to operatively engage the respective sliding clutch members 21, as clearly shown in Fig. 4.

The spaced arms 13 are connected to each other adjacent the shoulders 17 by means of a transverse rod 25, and a longitudinally extending rod 26 is centrally connected to the rod 25 and extends forwardly therefrom. The forward end of this rod is pivotally connected to a rocker arm 27 mounted upon the planter shaft 11. A ratchet wheel 28 is fixed to this shaft, being engaged by a pivoted spring-pressed pawl 29 carried by the rocker arm 27.

30 indicates the driver's seat which is mounted rearwardly of the axle 6 upon suitable supports fixed to the intermediate bars of the frame 5, said seat being also braced by means of an obliquely disposed rod or bar 31 which is mounted at its forward end upon the transverse rod 12.

In the operation of the invention, it will be understood that in the travel of the machine across a field, the edge of the double cam rides upon the lower curved edge of the rear downwardly extending portion 15 of the arms 13, and forces said arms upwardly until the high portion of each cam moves forwardly of the curved edge of the arm and in advance of the shoulders 17. The arms will then immediately drop downwardly upon the shoulders 19 of the cams and the transverse marker bar 16 will make an impression in the ground surface. The instant that the shoulders 17 of the arms are in coinciding relation with the shoulders 19 of the cams and the arms suddenly fall or drop, rotation is transmitted through the medium of the rod 26 and the pawl and ratchet to the shaft 11 so that said shaft is rotated and the planter mechanisms operated to deposit a quantity of seed into the boots 10. By the time the arms 13 come to a position of rest upon the inner portions of the cams, the flow of seed has been cut off. Thus it will be seen that the marking of the ground surface and the depositing of the seed is practically simultaneous. Ordinarily, corn is planted in hills with a space of four feet between the hills, and the cam members 18 will, of course, be of such diameter that the seed mechanisms are operated at the proper times. If, however, it is desired to deposit the hills of seed closer together, other cams may be substituted for the larger cams so that the intermittent action of the planter mechanisms will be quicker. By operating the planter mechanisms from the marker in the manner above explained, it will be seen that the proper spacing of the seed hills is assured.

From the foregoing description, taken in connection with the accompanying drawing, the construction, manner of operation and several advantages of my invention will be clearly and fully understood. The device, while exceedingly simple in construction, is positive and reliable in its operation, and may be manufactured and applied to various types of corn planters now known in the art at comparatively small expense.

While I have shown and described the preferred construction and arrangement of the several elements, it is to be understood that the invention is susceptible of considerable modification therein and I, therefore, reserve the privilege of adopting all such legitimate modifications as may be fairly embodied within the spirit and scope of the invention as claimed.

Having thus fully described my invention, what I desire to claim and secure by Letters Patent is:—

A device of the character described including an arm fulcrumed at one end, the other end of said arm having a curved lower edge provided with an angular shoulder therein, and a rotary cam element arranged beneath the arm and constituting the sole means of support for the free end thereof, the periphery of said cam co-acting with the curved lower edge of the arm, and said cam being provided with radially disposed shoulders corresponding to the shoulder in the lower edge of the arm whereby an intermittent, sudden downward gravity movement of the arm occurs in the rotation of the cam.

In testimony whereof I hereunto affix my signature in the presence of two witnesses.

GRANVIL F. DALLAS.

Witnesses:
  WILLIAM B. SHELTON,
  THOMAS S. SHIPE.

Copies of this patent may be obtained for five cents each, by addressing the "Commissioner of Patents, Washington, D. C."